UNITED STATES PATENT OFFICE.

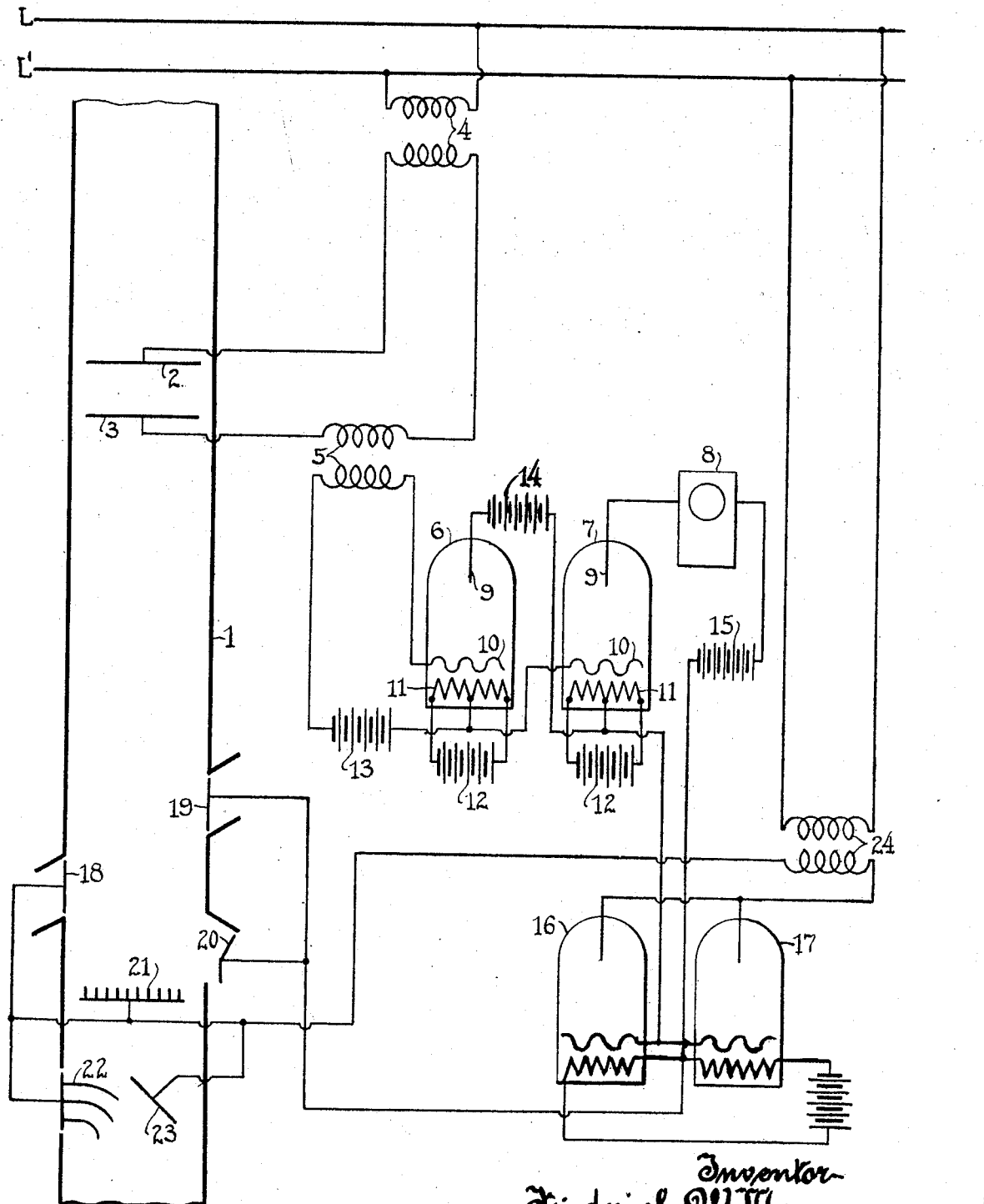

FRIEDRICH WILHELM MEYER, OF MADISON, WISCONSIN, ASSIGNOR TO THE CUTLER-HAMMER MFG. CO., OF MILWAUKEE, WISCONSIN, A CORPORATION OF WISCONSIN.

METHOD OF AND APPARATUS FOR MEASURING THE FLOW OF FLUIDS.

1,411,796.   Specification of Letters Patent.   Patented Apr. 4, 1922.

Application filed May 14, 1917. Serial No. 168,622.

*To all whom it may concern:*

Be it known that I, FRIEDRICH WILHELM MEYER, a citizen of the German Empire, residing at Madison, in the county of Dane and State of Wisconsin, have invented new and useful Improvements in Methods of and Apparatus for Measuring the Flow of Fluids, of which the following is a full, clear, concise, and exact description, reference being had to the accompanying drawing, forming a part of this specification.

This invention relates to a method of, and apparatus for, measuring the flow of fluids.

Heretofore it has been customary to measure the flow of fluids upon a temperature basis, the apparatus employed including means for supplying heat to the fluid, and the present invention has among its objects to provide a method of, and apparatus for accomplishing the desired measurement in a more simple and direct manner and without necessitating the use of such heat supplying means.

Other objects and advantages of the invention will hereinafter appear.

According to the present invention it is proposed to subject the fluid to be measured to a high electrical potential for ionization thereof and to ascertain the rate of flow upon the ionization basis thus afforded, as for example, by ascertainment of the influence of the ionization of the fluid upon the current flow in an electric circuit. Further, it is proposed to utilize one or more electroionic relays in the measuring apparatus for the purposes hereinafter set forth.

The invention will now be described more specifically in connection with the accompanying drawing, which illustrates schematically and diagrammatically one embodiment thereof.

Referring to the drawing, the same shows a pipe or conduit 1 for the flowing fluid, having arranged therein spaced electrodes 2 and 3 extending transversely thereof, although said electrodes may be alternatively arranged to extend in other directions. The electrodes 2 and 3 are respectively connected to the terminals of the secondary winding of a transformer 4, said transformer having its primary winding connected to an alternating current supply source L, L'. The transformer is designed to subject the electrodes to a high potential and the fluid, under the potential thus applied thereto by the electrodes, will be ionized and will cause a flow of current between the electrodes. Moreover, the ionized fluid will vary the resistance to the flow of current between the electrodes in proportion to the variations in flow of the fluid.

Thus such resulting variations in the resistance to the flow of current in the electrode circuit furnish a basis of measurement of the flow of fluid and the apparatus shown for accomplishing such measurement includes a current transformer 5 having its primary winding connected in the electrode circuit, electroionic relays 6 and 7 connected in a cascade relation with the former subjected to the influence of said transformer, and an electrical measuring instrument 8 controlled by said electroionic relays. The relays are of a well known type, each having an anode 9, an auxiliary anode 10 and a cathode 11, the latter being heated as by a battery 12. The relay 6 has its cathode and auxiliary anode connected to the secondary winding of transformer 5, the circuit including these elements constituting the sensitive circuit of the relay, and also including a battery 13. On the other hand, the relay 6 has its anode 9 and cathode 11 respectively connected to the cathode and auxiliary anode of relay 7, the circuit including these elements constituting the main circuit of relay 6 and the sensitive circuit of relay 7, and also including a battery 14. Relay 7 in turn has its main anode 9 and cathode 11 included in the circuit of measuring instrument 8 which is assumed to be an ampere hour meter, the circuit thereof including a battery 15. Thus assuming a variation in the current of the sensitive circuit of relay 6, said relay will effect a corresponding but amplified current variation in the sensitive circuit of relay 7 while the latter relay will, in turn, effect a corresponding but still further amplified current variation in the circuit of meter 8. Moreover the relays may be assumed to be of a type to rectify the alternating current supplied by the transformer whereby the use of a direct current measuring device is enabled.

For the moment disregarding the battery 13, it will thus be observed that a variation in the rate of flow of fluid will cause, as above described, a variation in the current in the electrode circuit, which variation will be transmitted through the transformer 5 to the relay 6 and thence through the relay 7 to the meter 8 and due to the amplifying effect of the relay, the meter will be rendered sensitive to very slight current variations in the electrode circuit and correspondingly slight variations in the rate of flow of fluid. If, however, an increase in flow of fluid reduces the current in the electrode circuit, the current supplied to the meter would be correspondingly reduced instead of increased as desired, and the battery 13 is provided to reverse such conditions. This battery is arranged to buck and predominate the transformer voltage whereby under the conditions just stated the current of the sensitive circuit of relay 6 will be increased as the current of the electrode circuit is decreased by an increase in flow which insures the desired change in the electrical conditions in the meter circuit.

In addition to the foregoing, the apparatus illustrated includes regulating means which may be advantageously employed under certain conditions. Such means comprise electroionic relays 16 and 17, similar to those above described and a plurality of electrodes 18, 19, 20, 21, 22, 23 connected thereto, said electrodes having functions analogous to those of the elements 2 and 3 aforedescribed, being arranged in different relations with respect to the fluid conduit. The relays 16 and 17 are arranged in a battery relation with their cathodes and auxiliary anodes included in the meter circuit to be subjected to variations in current in accordance with the rate of flow of fluid, while a transformer 24 is provided to supply the desired potential to the main circuits of said relays including said electrodes 18 to 23.

It is, of course, to be understood that with the arrangement illustrated, certain constant influences must be taken into account and correction thereof made in order to insure accurate measurement of the flow of fluid by means of the device 8. For example, with a potential impressed upon the electrodes 2 and 3, the fluid tends, even without flow, to influence the device 8, but in view of the exceedingly small currents in the sensitive circuits, such influence may be readily corrected by adjustment of the batteries or transformers. For example, such a tendency may be corrected by a predetermined adjusted voltage of the battery 13. Furthermore, according to the type of relay employed, a certain minimum voltage may be necessary to initiate discharge or, in certain cases, a negative voltage may be required to prevent the main discharge.

It is not essential that the ionization of the fluid be effected by means of the electrodes which influence the measuring device, since obviously the former action may be produced in part or wholly by independent electrodes or by an extraneous agency.

What I claim as new and desire to secure by Letters Patent is:

1. The method of measuring the flow of fluids which comprises subjecting the fluid to an ionizing agency for ionization thereof to produce an electroionic discharge and ascertaining the electroionic discharge of the fluid during flow thereof.

2. The method of measuring the flow of fluids which comprises subjecting the fluid to a high electrical potential for ionization thereof and ascertaining the ionization of the flowing fluid by its effect upon an electrical circuit.

3. The method of measuring the flow of fluids which comprises subjecting the fluid to a high electrical potential for ionization thereof and ascertaining the ionization of the flowing fluid by its effect upon the current flow in an electrical circuit.

4. The method of measuring the flow of fluids which comprises subjecting the fluid to a high electrical potential for ionization thereof, subjecting an electric current to the influence of the ionized fluid and measuring the current subject to such influence.

5. Apparatus for measuring the flow of fluids comprising electrodes to subject the flowing fluid to a high electrical potential for ionization thereof, an electrical measuring device and means including an amplifying device for subjecting said measuring device to the influence of the ionized fluid.

6. Apparatus for measuring the flow of fluids comprising electrodes to subject the flowing fluid to a high electrical potential for ionization thereof, an electrical measuring device and means including an electroionic relay for subjecting said device to the influence of the ionized fluid.

7. Apparatus for measuring the flow of fluids comprising a source of high electrical potential, electrodes connected to such source for subjecting the flowing fluid to such potential for ionization thereof whereby the fluid effects a flow of current between the electrodes variable with its rate of flow and means for measuring the current flowing between said electrodes.

8. Apparatus for measuring the flow of fluids comprising a source of high electrical potential, electrodes connected to such source for subjecting the flowing fluid to such potential for ionization thereof whereby the fluid effects a flow of current between the electrodes variable with its rate of flow, current measuring means and means including an electroionic relay for rendering said measuring means sensitive to variations in the flow of current between said electrodes.

9. Apparatus for measuring the flow of fluids comprising electrodes to subject the fluid to a high electrical potential for ionization thereof, an electroionic relay having a sensitive circuit subjected to the influence of the ionized fluid, means included in the sensitive circuit of said relay to subject the same to a given potential subject to the aforesaid influence of the ionized fluid and an electric measuring device controlled by said relay.

10. Apparatus for measuring the flow of fluids, comprising a source of high electrical potential, electrodes connected to such source for subjecting the flowing fluid to such potential for ionization thereof, an electrical circuit subjected to the influence of the ionized fluid whereby the fluid effects a flow of current in said circuit variable with its rate of flow, current measuring means and means including an electroionic relay for rendering said measuring device sensitive to variations in the flow of current in said circuit.

11. Apparatus for measuring the flow of fluids, comprising means for effecting ionization of the flowing fluid, a measuring device and means including an electroionic relay for subjecting said device to the influence of said ionized fluid.

In witness whereof, I have hereunto subscribed my name.

Dr. FRIEDRICH WILHELM MEYER.

Witnesses:
W. L. CAREY,
GEO. ZWICKY.